US008326297B2

(12) United States Patent
Kehren et al.

(10) Patent No.: US 8,326,297 B2
(45) Date of Patent: Dec. 4, 2012

(54) METHOD FOR OPERATING A WIRELESS MOBILE RADIO DEVICE AND A WIRELESS STATIONARY RADIO DEVICE CONNECTED THERETO

(75) Inventors: Dieter Kehren, Dinslaken (DE); Hans-Jürgen Loonen, Isselburg (DE); Andreas M. Müller, Rees (DE); Peter Scholz, Bocholt (DE); Wilfried Többen, Löningen (DE)

(73) Assignee: Gigaset Communications GmbH, Munich (DE)

( * ) Notice: Subject to any disclaimer, the term of this patent is extended or adjusted under 35 U.S.C. 154(b) by 62 days.

(21) Appl. No.: 12/744,674

(22) PCT Filed: Oct. 27, 2008

(86) PCT No.: PCT/EP2008/064503
§ 371 (c)(1),
(2), (4) Date: Aug. 23, 2010

(87) PCT Pub. No.: WO2009/071391
PCT Pub. Date: Jun. 11, 2009

(65) Prior Publication Data
US 2010/0311408 A1     Dec. 9, 2010

(30) Foreign Application Priority Data
Dec. 3, 2007  (DE) .................. 10 2007 057 986

(51) Int. Cl.
*H04W 4/00* (2009.01)
(52) U.S. Cl. .................. 455/435.1; 455/422.1; 455/425; 455/462; 379/15.03; 379/93.31
(58) Field of Classification Search .............. 455/422.1, 455/462, 418, 419, 425, 435.1–435.3; 379/15.03, 379/93.31
See application file for complete search history.

(56) References Cited

U.S. PATENT DOCUMENTS

| | | | |
|---|---|---|---|
| 5,515,420 A * | 5/1996 | Urasaka et al. ............... 455/564 |
| 5,905,956 A | 5/1999 | Young et al. |
| 6,061,571 A | 5/2000 | Tamura |
| 2006/0182271 A1 | 8/2006 | Kuwabara |

FOREIGN PATENT DOCUMENTS

| | | |
|---|---|---|
| DE | 19728696 | 9/1998 |
| EP | 1028575 | 8/2000 |
| EP | 1231799 | 8/2002 |

OTHER PUBLICATIONS

Siemens: "Gigaset 4170-417 ISDN Operating Instructions," http://www.andersonautomatisering.nl/download/Gigaset_4175.pdf.
* cited by examiner

*Primary Examiner* — Wayne Cai
(74) *Attorney, Agent, or Firm* — Kauth, Pomeroy, Peck & Bailey LLP (57) ABSTRACT

The invention relates to a method for operating at least one mobile radio transmission/radio receiving device (Intern 1) operating according to a wireless telecommunications standard on a stationary radio transmission/radio receiving device (Basis) operating according to the wireless telecommunications standard, and a stationary radio transmission/radio receiving device (Basis) and a mobile radio transmission/radio receiving device (Intern 1) for carrying out the method. The invention relates to a method for operating at least one mobile radio transmission/radio receiving device (Intern 1) operating according to a wireless telecommunications standard, particularly a DECT derivative, on a stationary radio transmission/radio receiving device (Basis) operating according to a wireless telecommunications standard, which stationary radio transmission/radio receiving device store at least one list, wherein at least one protocol notification relating to the list is generated by the mobile radio transmission/radio receiving device (Intern 1) and is transmitted (S1, S3, S7) to the stationary radio transmission/radio receiving device (Basis) such that the mobile radio transmission/radio receiving device (Intern 1) manipulates at least parts of the accesses relating to the list by means of the stationary radio transmission/radio receiving device (Basis). The invention further relates to a stationary (Basis) and mobile (Intern 1) radio transmission/radio receiving device having means for carrying out the method.

14 Claims, 2 Drawing Sheets

FIG 2

METHOD FOR OPERATING A WIRELESS MOBILE RADIO DEVICE AND A WIRELESS STATIONARY RADIO DEVICE CONNECTED THERETO

CROSS-REFERENCE TO RELATED APPLICATIONS

This application is a §371 national stage entry of International Application No. PCT/EP2008/064503, filed Oct. 27, 2008, which claims priority to German Patent Application No. 10 2007 057 986.3, filed Dec. 3, 2007, both of which are hereby incorporated by reference.

SUMMARY OF THE INVENTION

The invention relates to a method for operating at least one mobile radio transmission/radio receiving device operating according to a wireless telecommunications standard on a stationary radio transmission/radio receiving device operating according to the wireless telecommunications standard according to the preamble of claim 1 as well as a stationary radio transmission/radio receiving device according to the preamble of claim 11 and mobile radio transmission/radio receiving device according to the preamble of claim 14.

In the case of the current wireless communication system, the so-called Digital European Cordless Telefony Standard (DECT), it is obligatorily specified that mobile units operating according to DECT have to be registered at a base unit by means of a so-called Generic Access Profile (GAP) procedure according to the standard. This makes is possible that the registration process also functions across different manufacturers. For the logoff of other mobile units, initiated by a mobile unit, there is however no standardized solution.

It is the object of the invention to provide a method and a structure that makes a logoff possible.

The object is met, starting with the method, according to the preamble of claim 1 by means of the characterizing features. Furthermore it is solved by means of the characteristics of the stationary radio transmission/radio receiving device according to claim 13 and stationary radio transmission/radio receiving device according to claim 14. Preferred embodiments of the invention are addressed in the sub claims.

In the case of the method according to the invention for operating at least one mobile radio transmission/radio receiving device operating according to a wireless telecommunications standard, particularly a DECT derivative, on a stationary radio transmission/radio receiving device operating according to a wireless telecommunications standard, which stationary radio transmission/radio receiving device stores at least one list, wherein at least one protocol notification relating to the list is generated by the mobile radio transmission/radio receiving device and is transmitted to the stationary radio transmission/radio receiving device such that the mobile radio transmission/radio receiving device manipulates at least parts of the accesses relating to the list by means of the stationary radio transmission/radio receiving device.

Hereby can, in a manner spanning manufacturers, on the part of registered mobile units, from the most varied manufacturers, a log-off be initiated, whereby for the most part no adaptation of already known systems has to be implemented. The invention can therefore be implemented in already existing, but also in future, wireless systems.

In an advantageous further development the protocol message is generated in such a way that, on the side of the stationary radio transmission/radio receiving device, only elements of the list are read out and transmitted to the mobile radio transmission/radio receiving device that can be processed by the mobile radio transmission/radio receiving device.

By these means a particularly simplified adaption of the (missing, trnsl.) of mobile units to base station is achieved or the advantage of the support of mobile units that originate from manufacturers that are different from the manufacturers of the base station and can therefore also distinguish themselves from the base station through proprietary service and performance characteristics.

In the case of a further development of the invention a determination of the processing ability of the rendering possibilities of the mobile radio transmission/radio receiving device is based in particular on characteristics of the display.

This permits a further improvement of the discussed adaptation.

Alternatively or in a complementing manner the resources available to the mobile radio transmission/radio receiving device are used with the same advantage of a determination of their processing ability With a further improvement
a) the stationary radio transmission/radio receiving device carries mobile radio transmission/radio receiving devices registered with it as elements of a list,
b) the protocol message is generated by the mobile radio transmission/radio receiving device in such a manner that
   b1) the mobile radio transmission/radio receiving device specifies at least one of the registered mobile radio transmission/radio receiving devices whose entry should be deleted from the list,
   b2) the stationary radio transmission/radio receiving device deletes, in the event of receiving the protocol message, the corresponding entry and initiates a log-out procedure for the corresponding mobile radio transmission/radio receiving device Alternatively or complementary
a) the stationary radio transmission/radio receiving device keeps a list of mobile radio transmission/radio receiving devices registered with it,
b) the protocol message is generated by the mobile radio transmission/radio receiving device in such a manner that
   b1) the mobile radio transmission/radio receiving device specifies at least one of the not-registered mobile radio transmission/radio receiving devices whose entry should be entered into the list,
   b2) the stationary radio transmission/radio receiving device enters, in the event of receiving the protocol message, the corresponding element and initiates a registration procedure for the corresponding mobile radio transmission/radio receiving device.

In a further development of the invention the protocol messages are generated in such a manner that they follow a protocol that provides for a separation of objects and actions.

Furthermore the protocol messages are generated, alternatively or complementary, in a manner that they follow a protocol that is structured such that the stationary radio transmission/radio receiving device of the mobile radio transmission/radio receiving device transmits a menu structure, which is supported by the stationary radio transmission/radio receiving device, that is to be rendered on the mobile radio transmission/radio receiving device.

Preferably the protocol is thereby generated generically.

This can be further improved in such a manner that the protocol is generically structured in such a way that the menu structure is stored as a list and/or processed as such.

In a further improvement the list is designed advantageously in such a way that entries are stored as configuration parameters in such an organized manner that they are provided with, at least as a first element, a particularly permanent parameter identification and, as a second element, a value of the parameter that can be manipulated.

The discussed advantages result furthermore from a stationary radio transmission/radio receiving device that is identified by means in regard to the execution of the method according to the invention or the improvements.

The same applies regarding the mobile radio transmission/radio receiving device according to the invention and/or the improvements.

The invention thereby distinguishes itself advantageously from prior art because according to prior art only a log-off of mobile radio transmission/radio receiving devices (mobile station) is defined that was initiated by the stationary radio transmission/radio receiving device (base station). For this purpose the procedure is mandatorily prescribed for the base station and for the mobile unit merely as an option in the DECT (GAP)-Standard "Terminate access rights FT initiated", wherein a "Fixed Terminal" is meant by FT, meaning a base station is referred to, while the invention makes it possible that all mobile units have a log-off procedure available.

Furthermore the procedure "Terminate access rights PT initiated" is defined according to DECT or, for example, the so-called "DECT Packet Radio Service for data" DPRS for a log-off that is initiated by mobile unit (again support in PT is mandatory, in FT optional), whereby with PT a so-called "portable terminal", or therefore a mobile unit, is referred to. These procedures specify the message traffic between the base station and the mobile unit that to be logged-off on the network level ("Network", NWK).

By means of the invention it is made possible, in an advantageous manner in contrast to DECT, to transmit a user incentive for logging-off one's own, but especially someone else's mobile unit, from the mobile unit to the base, since from the DECT, which is known from prior art, only one's own mobile unit (mobile station) can be logged off with the procedure "Terminate access rights PT initiated".

A further advantage of the invention is that now a possible proprietary signaling, known from prior art, between the initiated mobile unit and a base station is no longer required and that its disadvantages, which are found in the fact that these proprietary signalings require that a compatibility between different manufacturers for this application is not possible, have been surmounted By means of the invention it is now possible to support methods for the access of the mobile unit to lists in the base station. Thereby it will be possible that mobile units from other manufacturers can access for example a so-called call-up list in the base station or a base station telephone book.

Besides the indication and editing of list entries the addition and deletion of list entries is also supported hereby. An additional list that can be viewed by this mechanism is the list of internal participants.

This is a special list since new entries cannot simply be added but instead come about through the registration of a new mobile unit which is then added by the base station into this list. This is utilized for the logging-out of a mobile unit according to the invention in such a way that now the list protocol is used in that the deletion of a list entry from the internal participant list is evaluated as the logging-out of just that internal participant. Likewise the invention provides, alternatively or complementary, that the insertion of a new entry in this list permits, and combines the procedure therewith, that the base station changes into the state of registration readiness.

By means of the improvement according to the invention which provides for a combination of the supported protocol function "Deletion of an entry from the internal participant list" with the performance characteristic "Logging-off of an internal participant" an additional, useful performance characteristic is made possible, spanning different manufacturers, without a new protocol or new protocol elements having to be defined. This combination saves definitions effort in the context of the standardization as well as also the implementation effort in the end devices and increases simultaneously the compatibility between manufacturers.

The invention also permits the support of the most different lists, which, functioning in wireless communication systems according to DECT, have to be accessible to the user of the system, such as for example telephone book, redialing, caller list, and such like.

This is in particular accomplished by means of the improvement according to the invention, which defines a protocol with a generic set of commands (actions) for the access to any lists and their list elements (objects). These furthermore distinguish themselves advantageously through their flexibility.

Alternatively or complementary the contents of the objects are thereby de-coupled from the actions so that with a set of commands the access to any list as well as also to any entries is assured.

Besides the sequential list access the protocol according to the invention also makes possible a specific search as well as the navigation through any lists.

Advantageously, elements of a list can thereby be provided with attributes, in particular attributes such as "read", "write", "execute" and others, in order to indicate which actions can be executed.

By means of the de-coupling the application field of the protocol is also expanded onto future lists with as yet unknown list elements without that the protocol itself would have to be expanded.

Furthermore the generic structure of the protocol is also suitable, for example, to transmit a menu tree between the base station and the mobile unit. In such a case the invention can be further developed in such a way that the menu tree is simply implemented as an additional list to be processed and the access as well as the navigation occurs through the menu by means of the generic set of commands that was already mentioned.

An alternative or complementary application of the protocol is in the manipulation of configuration parameters that are managed in the base station and are to be processed by means of the mobile unit.

These configuration parameters can also be presented as a list in a complementary manner, whereby their entries according to the invention usually consist of two elements. A (not changeable) identification of the parameter as well as the actual (modifiable) value of the parameter.

The defined protocol can according to the invention also be used in order to exchange information regarding which lists are actually offered or supported by a respective communication partner. For this purpose a special "list of lists" can be managed. The entries of this special list provide information regarding which list with which list entries is supported. As a result one can determine, through directed searching for the list type, whether the desired list is even supported, and if yes, to what extent.

The invention makes possible, as was partially explained already, a support of an access by means of a mobile unit to diverse lists that are managed in the base, such as for example the list of the internal participants but also Call-Log lists or an address book.

This access protocol according to the invention is therefore useable for systems, and it is in this case particularly advantageously applicable, that consist of products from different manufacturers. Namely systems in which the individual mobile units that are part of the system and the base station support different lists and, in the list entries, again different elements.

Because comparable scenarios were solved, in view of the proprietary Gigaset protocols known through prior art and also in the DECT standard, by means of the exchange of device characteristics in the run-up of the actual transaction. The invention however requires in contrast to this approach no complex communication between base station and mobile unit. Much more significant still is the advantage according to the invention in the case of a combination of devices from different manufacturers since the number of variables that can be combined is still higher and therefore the complexity of this exchange is raised even further.

This is particularly enhanced through an improvement that is based on a list that is based on the described generic list access protocol, according to the invention, which offers a specific access to the individual elements of a list entry as well as realizes a request/reply mechanism with which the mobile unit takes on the role of the client and the base the role of the server.

By means of the discussed improvement a refinement is provided by the fact that the mobile unit during access of the list also specifies the elements of a list entry that it can support at the current point in time.

Hereby known elements form the superset which is further restricted through, as the case may be, restrictions in the rendering possibilities, for example the number and type of elements of an entry that can currently be rendered, or due to the available resources, for example how many elements of an entry can currently be stored.

The base station again answers the request with those of the requested elements that are themselves supported.

The method according to the invention thereby leaves the usual path from the DECT of the Capability-exchange (Terminal Capability, FixedPart-Capability) and defines a protocol that automatically adapts itself to the characteristics of the communicating partners.

The method additionally has the advantage that the maximally possible compatibility between devices of different manufacturers or performance classes, for example regarding display or memory, can be achieved without requiring the costly exchange of the characteristics of the devices.

Furthermore display forms in the mobile unit can, according to the invention, be adapted to one's own resources, whereby this can be implemented with the help of the further improvement without the base station having to know these. For this purpose in an advantageous way and in the case of a mobile unit that only supports one display line, only the name of the contact is displayed in the first step and then, after corresponding interaction by the user, the telephone number is requested and displayed, whereby the address is eventually, because of memory reasons, not supported at all and therefore also not requested.

The further improvement is thereby so flexible that, in contrast, a mobile unit with a multi-line display and better memory resources can read and display the complete entry with the protocol according to the invention.

An additional advantage is the fact that the data traffic on the air interface is limited to the essential and transmission of unsupported elements is avoided.

The method furthermore features a good capability of expansion because additional elements can be defined anytime since, as soon as base as well as mobile unit support them, these can also be exchanged while otherwise a function is nonetheless not assured.

BRIEF DESCRIPTION OF THE DRAWINGS

Additional details, advantages of the invention are further explained in reference to the embodiment examples presented in FIGS. 1 and 2. The drawings show.

DETAILED DESCRIPTION

Figure 1:
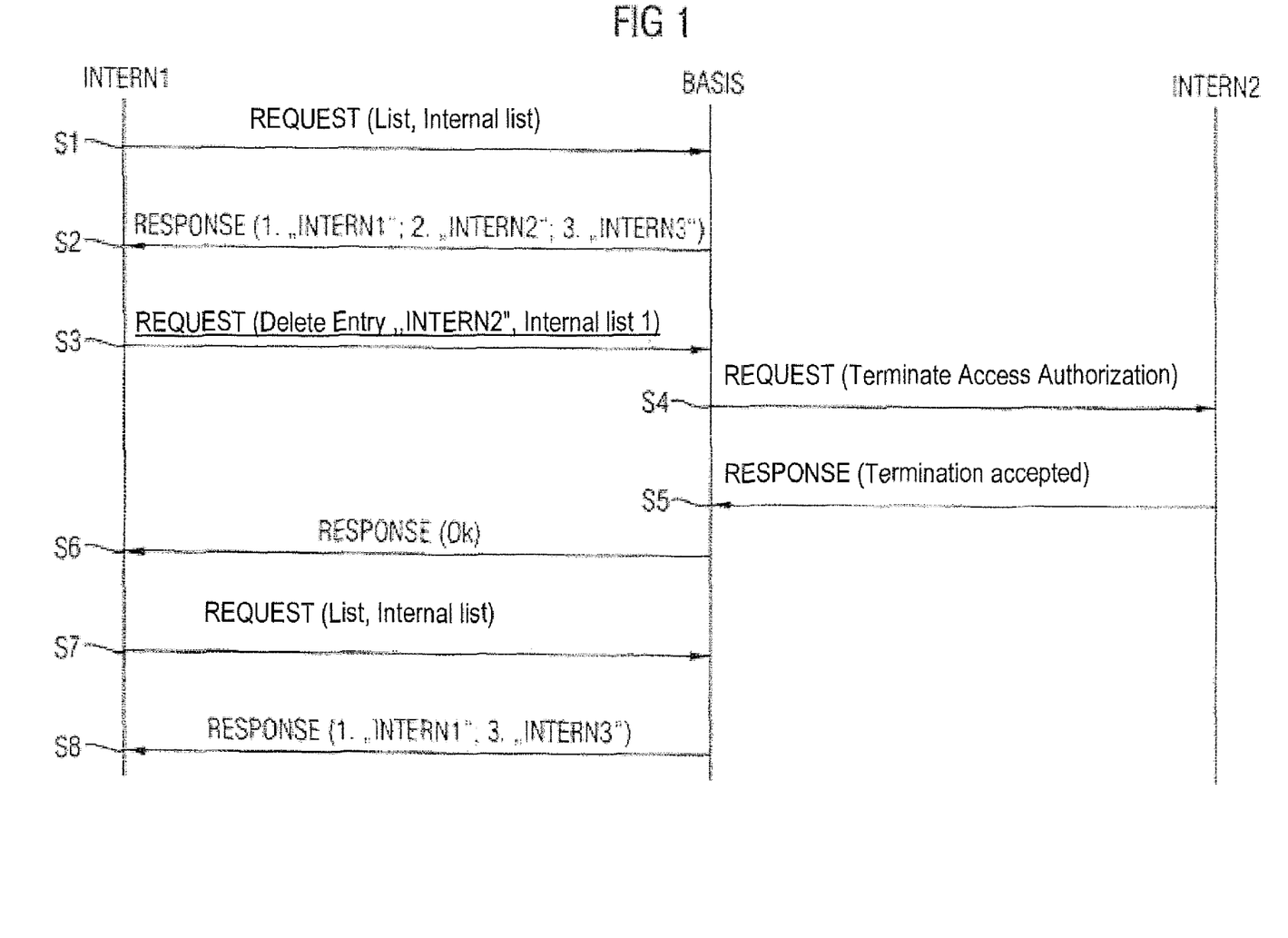
FIG. 1 a flow chart of the embodiment example that is particularly useful for DECT derivatives of the initiation of a mobile unit log-off according to the invention, FIG. 2 a flow chart during utilization of one of the protocols according to the invention

In FIG. 1 is presented a flow chart of an embodiment example of the method according to the invention for the processing of lists according to the invention. In regard to this processing an example for a definition, according to the invention, of the protocol messages, which are the basis for the sequence represented in FIG. 1, is explained in what follows.

1. Structure of an Information Element:

| Bit: | | | | | | | | Octet |
|---|---|---|---|---|---|---|---|---|
| 8 | 7 | 6 | 5 | 4 | 3 | 2 | 1 | |
| 0 | | | << IWU-TO-IWU >> | | | | | 1 |
| | | | Length of content (L) | | | | | 2 |
| 1 | S/R | | Protocol discriminator | | | | | 3 |
| | | | Reference ID | | | | | 4 |
| | | | Command | | | | | 5 |
| | | | Command-specific octets | | | | | 6 |
| | | | | | | | | L + 2 |

Protocol discriminator=0 0 0 0 1 1—NG DECT Part 3, List transfer.

S/R Bit—1—Transmission of the message.

The reference ID is thereby an unambiguous identification of the transaction consisting of a prompting message and one or several response messages.

Command (Octet 5):

| Bits | | | | | | | | Meaning |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | NACK |
| 0 | 0 | 0 | 0 | 0 | 0 | 0 | 1 | ACK |
| 0 | 0 | 0 | 0 | 0 | 0 | 1 | 0 | DATA PACKET |
| 0 | 0 | 0 | 0 | 0 | 0 | 1 | 1 | LAST DATA PACKET |
| 0 | 0 | 0 | 0 | 0 | 1 | 0 | 0 | READ ENTRY |
| 0 | 0 | 0 | 0 | 0 | 1 | 0 | 1 | DELETE ENTRY |
| 0 | 0 | 0 | 0 | 0 | 1 | 1 | 0 | EDIT ENTRY |
| 0 | 0 | 0 | 0 | 0 | 1 | 1 | 1 | CREATE ENTRY |
| 0 | 0 | 0 | 0 | 1 | 0 | 0 | 0 | SAVE ENTRY |
| 0 | 0 | 0 | 0 | 1 | 0 | 0 | 1 | DELETE LIST |
| 1 | x | xx | | xx | | x | x | proprietary commands |

2. Commands and Command-Specific Contents

2.1 Command ACK

| 8 | 7 | 6 | 5 | 4 | 3 | 2 | 1 | Octet: |
|---|---|---|---|---|---|---|---|---|
| | | | Bit: | | | | | |
| 0 | | | << IVVU-TO-IWU >> | | | | | 1 |
| | | | Length of content (L) | | | | | 2 |
| | | | Protocol Discriminator | | | | | 3 |
| 1 | 1 | | Reference ID | | | | | 4 |
| | | | Command = ACK | | | | | 5 |
| | | | Ground | | | | | 6 |

Ground (Octet 6):

| 8 | 7 | 6 | 5 | 4 | 3 | 2 | 1 | Meaning |
|---|---|---|---|---|---|---|---|---|
| | | | Bits | | | | | |
| 0 | 0 | 0 | 0 | 0 | 0 | 0 | 0 | positive confirmation |
| | | | | | | | | negative confirmation: |
| 0 | 0 | 0 | 0 | 0 | 0 | 0 | 1 | List not available |
| 0 | 0 | 0 | 0 | 0 | 0 | 1 | 0 | List empty. |
| 0 | 0 | 0 | 0 | 0 | 0 | 1 | 1 | Entry blocked |
| 0 | 0 | 0 | 0 | 0 | 1 | 0 | 0 | Command not supported |
| | | | | Other values reserved | | | | |

2.3 Command DATA PACKET

| 8 | 7 | 6 | 5 | 4 | 2 | 1 | Octet: |
|---|---|---|---|---|---|---|---|
| | | | Bit: | | | | |
| 0 | | | << IWU-TO-IWU >> L | | | | 1 |
| | | | Length of content (L) | | | | 2 |
| 1 | 1 | | Protocol discriminator Reference ID | | | | 3 |
| | | | command = DATA PACKET | | | | 4 |
| | | | | | | | 5 |
| | | | Content of data stream | | | | 6 |
| | | | | | | | L + 2 |

Contents of the data stream have the following structure and can be segmented into a plurality of data packets (DATA PACKETS).

| 8 | 7 | 6 | 5 | 4 | 3 | 2 | 1 | Octet: |
|---|---|---|---|---|---|---|---|---|
| | | | Bit: | | | | | |
| | | | Field ID = List Attributes | | | | | |
| | | | Length | | | | | |
| | | | Content | | | | | |
| | | | Field ID = Entry ID | | | | | |
| | | | Length | | | | | |
| | | | Content | | | | | |
| | | | 1. Field ID | | | | | |
| | | | 1. Field length | | | | | |
| | | | 1. Field content | | | | | |
| | | | 2. Feld ID | | | | | |
| | | | 2. Field_length | | | | | |
| | | | 2. Field content | | | | | |
| | | | last Field ID | | | | | |
| | | | last Field length | | | | | |
| | | | last Field content | | | | | |
| | | | Field ID = Entry ID | | | | | |
| | | | length | | | | | |
| | | | content | | | | | |

| 8 | 7 | 6 | 5 | 4 | 3 | 2 | 1 | Octet: |
|---|---|---|---|---|---|---|---|---|
| | | | Bit: | | | | | |
| | | | 1. Field ID | | | | | |
| | | | 1. Field length | | | | | |
| | | | 1. Field content | | | | | |

2.4 Command LAST DATA PACKET

The data packet that contains the last octet of the data stream should feature the coding "LAST DATA PACKET" in octet 5 of the IE <<IWU-TO-IWU>>.

Aside from that the structure corresponds to the structure of DATA PACKET.

2.5 Command SEARCH ENTRY

| 8 | 7 | 6 | 5 | 4 | 3 | 2 | 1 | Octet: |
|---|---|---|---|---|---|---|---|---|
| | | | Bit | | | | | |
| 0 | | | << IWU-TO-IWU >> | | | | | 1 |
| | | | Length of content (L) | | | | | 2 |
| 1 | 1 | | Protocol-discriminator | | | | | 3 |
| | | | Reference ID | | | | | 4 |
| | | | command = SEARCH ENTRY | | | | | 5 |
| | | | Listen ID | | | | | 6 |
| | | | Listen Attributes | | | | | |
| | | | Startindex | | | | | |
| | | | counter | | | | | |
| | | | 1. Field 1D | | | | | |
| | | | 1. Field Length | | | | | |
| | | | 1. Field content | | | | | |
| | | | 2. Field ID | | | | | |
| | | | 2. Field Length | | | | | |
| | | | 2. Field content | | | | | |
| | | | last Field ID | | | | | |
| | | | last Field Length | | | | | |
| | | | last Field content | | | | | |

2.5 Command READ ENTRY

| 8 | 7 | 6 | 5 | 4 | 3 | 2 | 1 | Octet: |
|---|---|---|---|---|---|---|---|---|
| | | | Bit: | | | | | |
| 0 | | | << IWU-TO-IWU >> | | | | | 1 |
| | | | Length of content (L) | | | | | 2 |
| 1 | 1 | | Protocol-discriminator | | | | | 3 |
| | | | Reference ID | | | | | 4 |
| | | | command = READ ENTRY | | | | | 5 |
| | | | List ID | | | | | 6 |
| | | | List Attributes | | | | | 7 |
| | | | Start Index | | | | | 8 |
| | | | counter | | | | | 9 |
| | | | 1. Field ID | | | | | 10 |
| | | | 2. Field ID | | | | | |
| | | | ... | | | | | |
| | | | last Field 1D | | | | | L + 2 |

List Index (Octet 7):

| 8 | 7 | 6 | 5 | 4 | 3 | 2 | 1 | Meaning |
|---|---|---|---|---|---|---|---|---|
| | | | Bits | | | | | |
| 1 | 1 | 1 | 1 | 1 | 1 | 1 | 1 | Last entry |
| | | | Other values | | | | | List entry |

List Attributes (Octet):

| Bits | | | | | | | | Meaning |
|---|---|---|---|---|---|---|---|---|
| 8 | 7 | 6 | 5 | 4 | 3 | 2 | 1 | |
| x | x | x | x | x | x | x | 1 | Total count of entries |
| other values | | | | | | | | reserved |

Counter (Octet):

| Bits | | | | | | | | Meaning |
|---|---|---|---|---|---|---|---|---|
| 8 | 7 | 6 | 5 | 4 | 3 | 2 | 1 | |
| 0 | x | x | x | x | x | x | x | forward |
| 1 | x | x | x | x | x | x | x | backward |

2.6 Command DELETE ENTRY

| Bit: | | | | | | | | Octet: |
|---|---|---|---|---|---|---|---|---|
| 8 | 7 | 6 | 5 | 4 | 3 | 2 | 1 | |
| 0 | | | << IWU-TO-IWU >> | | | | | 1 |
| | | | Length of content (L) | | | | | 2 |
| 1 | 1 | | Protocol-discriminator | | | | | 3 |
| | | | Reference ID | | | | | 4 |
| | | | command = DELETE ENTRY | | | | | 5 |
| | | | List ID | | | | | 6 |
| | | | Entry ID | | | | | 7 |

2.7 Command EDIT ENTRY

| Bit: | | | | | | | | Octet: |
|---|---|---|---|---|---|---|---|---|
| 8 | 7 | 6 | 5 | 4 | 3 | 2 | 1 | |
| 0 | | | << IWU-TO-IWU >> | | | | | 1 |
| | | | Length of content (L) | | | | | 2 |
| 1 | 1 | | Protocol-discriminator | | | | | 3 |
| | | | Reference ID | | | | | 4 |
| | | | Command = EDIT ENTRY | | | | | 5 |
| | | | List ID | | | | | 6 |
| | | | Entry ID | | | | | 7 |
| | | | 1. Field ID | | | | | 8 |
| | | | 2. Field ID | | | | | |
| | | | ... | | | | | |
| | | | last Field ID | | | | | L + 2 |

2.8 Command CREATE ENTRY

| Bit: | | | | | | | | Octet: |
|---|---|---|---|---|---|---|---|---|
| 8 | 7 | 6 | 5 | 4 | 3 | 2 | 1 | |
| 0 | | | << IWU-TO-IWU >> | | | | | 1 |
| | | | Length of content (L) | | | | | 2 |
| 1 | 1 | | Protocol-discriminator | | | | | 3 |
| | | | Reference ID | | | | | 4 |
| | | | Command = CREATE ENTRY | | | | | 5 |
| | | | List ID | | | | | 6 |
| | | | 1. Field ID | | | | | 7 |
| | | | 2. Field ID | | | | | |
| | | | last Field ID | | | | | L + 2 |

2.9 Command SAVE ENTRY

| Bit: | | | | | | | | Octet: |
|---|---|---|---|---|---|---|---|---|
| 8 | 7 | 6 | 5 | 4 | 3 | 2 | 1 | |
| 0 | | | << IWU-TO-IWU >> | | | | | 1 |
| | | | Length of content (L) | | | | | 2 |
| 1 | 1 | | Protocol-discriminator | | | | | 3 |
| | | | Reference ID | | | | | 4 |
| | | | Command = SAVE ENTRY | | | | | 5 |
| | | | List ID | | | | | 6 |
| | | | Entry ID | | | | | 7 |
| | | | 1. Field ID | | | | | 8 |
| | | | 2. Field ID | | | | | |
| | | | ... | | | | | |
| | | | last Field ID | | | | | L + 2 |

2.10 Command DELETE LIST

| Bit: | | | | | | | | Octet: |
|---|---|---|---|---|---|---|---|---|
| 8 | 7 | 6 | 5 | 4 | 3 | 2 | 1 | |
| o | | | << IVVU-TO-IWU >> | | | | | 1 |
| | | | Length of content (L) | | | | | 2 |
| 1 | 1 | | Protocol-discriminator | | | | | 3 |
| | | | Reference ID | | | | | 4 |
| | | | Command = DELETE ENTRY | | | | | 5 |
| | | | List 1D | | | | | 6 |
| | | | Entry ID | | | | | 7 |

2.11 Proprietary Commands

| Bit: | | | | | | | | Octet: |
|---|---|---|---|---|---|---|---|---|
| 8 | 7 | 6 | 5 | 4 | 3 | 2 | 1 | |
| | | | Command = proprietary | | | | | 5 |
| | | | Discriminator = EMC | | | | | 6 |
| | | | Discriminator (continued) | | | | | 7 |
| | | | Proprietary contents | | | | | 8 |
| | | | | | | | | L + 2 |

If present, octet 5 indicates proprietary content:

3. List ID

The following lists are defined:

List ID:

| Bits | | | | | | | | Meaning |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | private address book |
| 0 | 0 | 0 | 0 | 0 | 0 | 0 | 1 | global address book |
| 0 | 0 | 0 | 0 | 0 | 0 | 1 | 0 | internal list |
| 0 | 0 | 0 | 0 | 0 | 0 | 1 | 1 | List of outgoing calls |
| 0 | 0 | 0 | 0 | 0 | 1 | 0 | 0 | List of connected calls |
| 0 | 0 | 0 | 0 | 0 | 1 | 0 | 1 | List of missed calls |
| 0 | 0 | 0 | 0 | 0 | 1 | 1 | 0 | Lists ID list |
| 1 | x | x | x | x | x | x | x | proprietary list |

Commands of specific content are described in what follows:

4. Matrix of Lists Regarding Prescribed Fields

|  | Last name | No | List ID |
|---|---|---|---|
| Private address book | m | m | |
| Global address book | m | m | |
| Internal list | | m | |
| List of outgoing calls | | m | |
| List of connected calls | | m | |
| List of missed calls | | m | |
| Lists ID list | | | m |

5. Field ID

Fields should exhibit the following structure if the $8^{th}$ and the $7^{th}$ bit in the first octet are not set:

| Bit: | | | | | | | | Octet: |
|---|---|---|---|---|---|---|---|---|
| 8 | 7 | 6 | 5 | 4 | 3 | 2 | 1 | |
| 0 | 0 | \multicolumn{6}{c}{Field ID} | x |
| \multicolumn{8}{c}{Length (L)} | x + 1 |
| \multicolumn{8}{c}{Field-specific content} | x + 3 |
| | | | | | | | | x + 4 |

If the field contains only one octet of content the field with the length (L) is left out and bit 8 of the $1^{st}$ octet is set to "0" and bit 7 is set to "1":

| Bit: | | | | | | | | Octet |
|---|---|---|---|---|---|---|---|---|
| 8 | 7 | 6 | 5 | 4 | 3 | 2 | 1 | |
| 0 | 1 | \multicolumn{6}{c}{Field ID} | x |
| \multicolumn{8}{c}{content} | x + 1 |

If the field contains two octets of content, the field with the length (L) is left out and bit 8 of the $1^{st}$ octet is set to "1" and bit 7 is set to "0":

| Bit: | | | | | | | | Octet: |
|---|---|---|---|---|---|---|---|---|
| 8 | 7 | 6 | 5 | 4 | 3 | 2 | 1 | |
| 1 | 0 | \multicolumn{6}{c}{Field ID} | x |
| \multicolumn{8}{c}{Inhalt} | X + 1 |
| \multicolumn{8}{c}{Content (continued)} | X + 2 |

The following field ID is defined:
Field ID:

| Bits | | | | | | Meaning |
|---|---|---|---|---|---|---|
| 6 | 5 | 4 | 3 | 2 | 1 | |
| 0 | 0 | 0 | 0 | 0 | 0 | Entry ID |
| 0 | 0 | 0 | 0 | 0 | 1 | List attributes |
| 0 | 0 | 0 | 0 | 1 | 0 | — |
| 0 | 0 | 0 | 0 | 1 | 1 | List index |
| 0 | 0 | 0 | 1 | 0 | 0 | List ID |
| 0 | 0 | 0 | 1 | 0 | 1 | No. |

-continued

| Bits | | | | | | Meaning |
|---|---|---|---|---|---|---|
| 6 | 5 | 4 | 3 | 2 | 1 | |
| 0 | 0 | 0 | 1 | 1 | 0 | First name |
| 0 | 0 | 0 | 1 | 1 | 1 | Last name |
| 0 | 0 | 1 | 0 | 0 | 0 | City |
| 0 | 0 | 1 | 0 | 0 | 1 | Zip code |
| 0 | 0 | 1 | 0 | 1 | 0 | Street |
| 0 | 0 | 1 | 0 | 1 | 1 | House no. |
| 0 | 0 | 1 | 1 | 0 | 0 | Country |
| 0 | 0 | 1 | 1 | 0 | 1 | Birthday |
| 0 | 0 | 1 | 1 | 1 | 0 | Time |
| 0 | 0 | 1 | 1 | 1 | 1 | Nickname |
| 0 | 1 | 0 | 0 | 0 | 0 | Message status |
| 1 | x | x | x | x | x | proprietary Fields |

5.1 Field 'ID Entry'

| Bit: | | | | | | | | Octet: |
|---|---|---|---|---|---|---|---|---|
| 8 | 7 | 6 | 5 | 4 | 3 | 2 | 1 | |
| 1 | 0 | \multicolumn{6}{c}{Field ID = Entry ID} | x |
| \multicolumn{8}{c}{Value} | x + 1 |
| \multicolumn{8}{c}{Value (continued)} | x + 2 |

The entry ID is a system-wide identification of a list element which is provided by the base station.

5.2 Field 'Listen Attributes'

| Bit: | | | | | | | | Octet: |
|---|---|---|---|---|---|---|---|---|
| 8 | 7 | 6 | 5 | 4 | 3 | 2 | 1 | |
| 0 | 0 | \multicolumn{6}{c}{Field ID = List attributes} | x |
| \multicolumn{8}{c}{Length (L)} | x |
| \multicolumn{8}{c}{Total number of list entries} | x + 1 |
| \multicolumn{8}{c}{Total number of list entries (continued)} | x + 2 |
| | | | | | | | | x + 3 |
| | | | | | | | | X + L |

5.3 Field 'List Index'

| Bit: | | | | | | | | Octet: |
|---|---|---|---|---|---|---|---|---|
| 8 | 7 | 6 | 5 | 4 | 3 | 2 | 1 | |
| 1 | 0 | \multicolumn{6}{c}{Field ID = List index} | x |
| \multicolumn{8}{c}{Value} | x + 1 |
| \multicolumn{8}{c}{Value (continued)} | x + 2 |

5.4 Field 'List Id'

| Bit: | | | | | | | | Octet: |
|---|---|---|---|---|---|---|---|---|
| 8 | 7 | 6 | 5 | 4 | 3 | 2 | 1 | |
| 0 | 0 | \multicolumn{6}{c}{Field ID = List ID} | x |
| \multicolumn{8}{c}{Field ID = List ID} | x |
| \multicolumn{8}{c}{Length (L)} | x + 1 |
| Editable | x | x | x | x | x | x | x | x + 2 |
| \multicolumn{8}{c}{1. List ID} | x + 3 |
| \multicolumn{8}{c}{2. List ID} | x + 4 |
| | | | | | | | | X + L |

5.5 Field 'No.'/'Zip Code'/'House No.'

| | | | Bit: | | | | | |
|---|---|---|---|---|---|---|---|---|
| 8 | 7 | 6 | 5 | 4 | 3 | 2 | 1 | Octet |
| | | Field ID = No. | | | | | | x |
| | | Length (L) | | | | | | x + 1 |
| editable | internal | Self | x | x | x | x | x | x + 2 |
| | | 1. Number | | | | | | x + 3 |
| | | 2. Number | | | | | | x + 4 |
| | | | | | | | | X + L |

5.6 Fields 'First Name'/'Last Name'/'Nickname'/'City'/'Street'/'Country'

| | | | Bit: | | | | | |
|---|---|---|---|---|---|---|---|---|
| 8 | 7 | 6 | 5 | 4 | 3 | 2 | 1 | Octet: |
| | | Field ID | | | | | | x |
| | | Length (L) | | | | | | x + 1 |
| editable | Latin 1 | x | x | x | x | x | x | x + 2 |
| | | 1. symbol | | | | | | x + 3 |
| | | 2. symbol | | | | | | x + 4 |
| | | ... | | | | | | |
| | | | | | | | | X + L |

5.7 Fields 'Time'/'Birthday'

| | | | Bit: | | | | | |
|---|---|---|---|---|---|---|---|---|
| 8 | 7 | 6 | 5 | 4 | 3 | 2 | 1 | Octet: |
| | | Field ID = Date | | | | | | x |
| | | Length (L) | | | | | | x + 1 |
| edititable | x | x | x | x | x | x | x | x + 2 |
| Content as for IE <<Time-DATE>> specified Octet 3 | | | | | | | | x + 3 |
| Content as for IE <<Time-DATE>> specified Octet 4 | | | | | | | | x + 4 |
| | | ... | | | | | | |
| | | | | | | | | X + L |

Octets x+3 and the following are described, just as in the case of octet 3 and the following, in IE <<Time-Date>> (EN 300 175-5).

Only the interpretation of the coding 000000 (=current time/date) is permitted.

5.8 Field 'Message Status'

| | | | Bit: | | | | | |
|---|---|---|---|---|---|---|---|---|
| 8 | 7 | 6 | 5 | 4 | 3 | 2 | 1 | Octet: |
| | | Field ID = Message status | | | | | | x |
| | | Length (L) | | | | | | x + 1 |
| edititable | x | x | x | x | x | x | x | x + 2 |
| | | Message status | | | | | | x + 3 |
| | | Message status | | | | | | x + 4 |

5.9 Proprietary Fields

| | | | Bit | | | | | |
|---|---|---|---|---|---|---|---|---|
| 8 | 7 | 6 | 5 | 4 | 3 | 2 | 1 | Octet: |
| Field ID = proprietary Fields | | | | | | | | x |
| Length (L) | | | | | | | | x + 1 |
| Discriminator = EMC | | | | | | | | x + 3 |
| Discriminator (continued) | | | | | | | | x + 4 |
| Proprietary contents | | | | | | | | |
| | | | | | | | | X + L |

Subject to the utilization of at least a part of the discussed protocol elements and -messages a request REQUEST is sent, with reference to the embodiment example presented in FIG. 1, in a first step S1 from a first mobile unit INTERN1, which is registered with a base station BASIS according to the invention, to the base station BASIS which contains the parameters "list" and "internal list", with which said mobile unit triggers the readout of the list "internal list" on the part of the base station BASIS.

Subsequent to this, in a second step S2, a response message is sent from the base station BASIS to the first registered mobile unit INTERN1 which delivers back as parameters the identifications of the registered mobile units, for example labeled with "INTERN1", "INTERN2" and "INTERN3".

In a third step now comes the initiation of the log-off of a second registered mobile unit INTERN2 by means of the first registered mobile unit INTERN1, as provided by the invention. This is implemented in the presented example by means of an additional request REQUEST which occurs in a third step S3 and contains as parameters the command "delete entry" (or also labeled "DELETE ENTRY") as well as the command parameters that specify the list ("internal list") and the entry to be deleted ("INTERN2").

As a reaction to this request a defined log-off procedure, which for this example is based on the DECT or defined for a DECT derivative, is now initiated, according to the invention, on the side of the base station BASIS, said procedure transmits in a fourth step S4 to the second registered mobile unit INTERN2 a request REQUEST for the termination of the access authorization (also specified as "Access Rights", "Terminate Request"). Whereupon the second registered mobile unit INTERN2 transmits, in a fifth step S5, a response message RESPONSE to the base station BASIS, which receives the acceptance of the termination as a message (can also be labeled as "Access Rights", "Terminate Request").

The base station BASIS now reports in a sixth step S6 within the context of a response message RESPONSE to the first registered mobile unit INTERN1 that the log-off of the second registered mobile unit INTERN2, which was initiated by said first mobile unit, was successfully completed ("OK").

According to the invention this leads to the deletion of the second mobile unit INTERN2 from the list of the internal participants, which according to the selected example shall be determined by the first registered mobile unit in a seventh step S7 by means of a request for the list content and, in an eight step S8, by evaluating it and is finally, by means of a response, merely confirmed to the first registered and a third registered station INTERN1, INTERN3.

Figure 2:
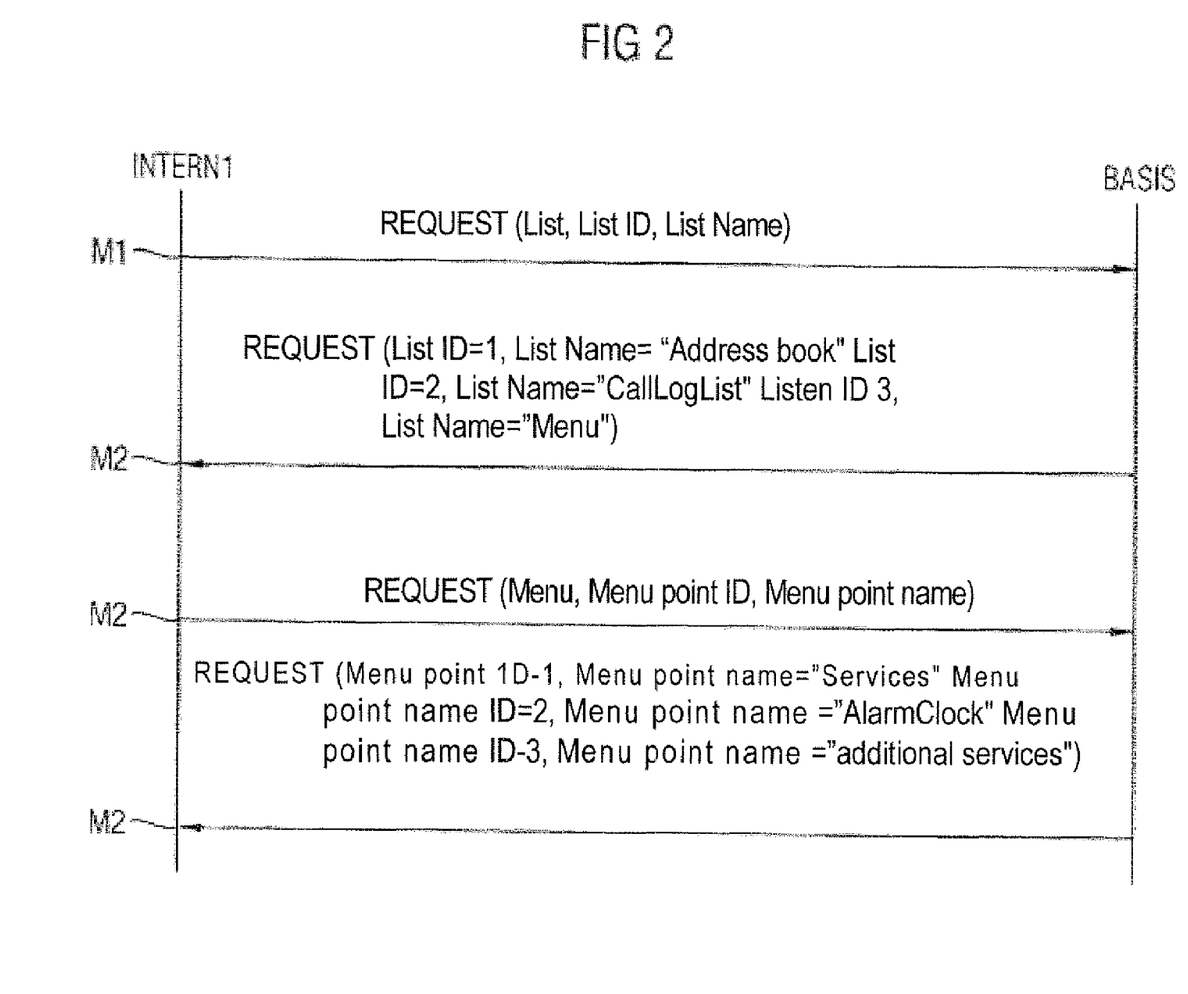

In the example presented in FIG. 2, which for example further develops the example that was described in FIG. 1, and therefore can also be based on the described protocol messages and elements, is a flow chart in which, in a first step M1, a registered mobile unit, for example the first registered mobile unit INTERN1, accesses the fields of a list, in which the lists that are accessible in the base station are stored in an organized form—the "list of lists", that is stored in the base station BASIS. In a specific example this is implemented with a request REQUEST which provides as parameters that this concerns the request regarding the lists as well as the additional command parameters List ID and List Name.

This is followed, as a second step M2, by the transmission of a message designed as a response message REPLY to the first registered mobile station INTERN1 that indicates the available lists.

In a third step M3 the first registered mobile unit can request with an inquiry REQUEST only those menu entries that can be applied at this base station BASIS—and are prescribed by the base station by means of the list "menu".

These are subsequently returned in a fourth step M4 by the base station BASIS by means of a response message REPLY in such a way that every menu entry and the name of the menu entry is returned so that the first registered mobile unit INTERN1 is informed regarding the complete menu structure that can be utilized with the base station BASIS.

The invention claimed is:

1. Method for operating at least one mobile radio transmission/radio receiving device operating according to a wireless telecommunications standard, particularly a DECT derivative, on a stationary radio transmission/radio receiving device operating according to a wireless telecommunications standard, with which on the side of at least one of the radio transmission/radio receiving devices, in particular the stationary one, at least one list containing list entries and different elements is stored, wherein, on the side of the mobile radio transmission/radio receiving device, at least one protocol notification relating to the list is generated and transmitted to the stationary radio transmission/radio receiving device such that the mobile radio transmission/radio receiving device manipulates at least parts of the accesses relating to the list by means of the stationary radio transmission/radio receiving device, whereby the mobile radio transmission/radio receiving device specifies upon transmission of the protocol notification the elements of a list entry, that it can support at a current point of time.

2. Method according to claim 1, wherein the protocol message is generated in such a way that, on the side of the stationary radio transmission/radio receiving device, only elements of the list are read out and transmitted to the mobile radio transmission/radio receiving device that can be processed by the mobile radio transmission/radio receiving device.

3. Method according to claim 2, wherein a determination of the processing ability of the rendering possibilities of the mobile radio transmission/radio receiving device is based in particular on characteristics of the display.

4. Method according to claim 2, wherein a determination of the processing ability is based on the determination of the resources available to the mobile radio transmission/radio receiving device.

5. Method according to claim 1, wherein,
 a) the stationary radio transmission/radio receiving device carries mobile radio transmission/radio receiving devices registered with it as elements of a list, and
 b) the protocol message is generated by the mobile radio transmission/radio receiving device in such a manner that
  b1) the mobile radio transmission/radio receiving device specifies at least one of the registered mobile radio transmission/radio receiving devices whose entry should be deleted from the list,
  b2) the stationary radio transmission/radio receiving device deletes, in the event of receiving the protocol message, the corresponding entry and initiates a logout procedure for the corresponding mobile radio transmission/radio receiving device.

6. Method according to claim 1, wherein,
 a) the stationary radio transmission/radio receiving device carries mobile radio transmission/radio receiving devices registered with it as elements of a list, and
 b) the protocol message is generated by the mobile radio transmission/radio receiving device in such a manner that
  b1) the mobile radio transmission/radio receiving device specifies at least one of the not-registered mobile radio transmission/radio receiving devices whose entry should be entered into the list,
  b2) the stationary radio transmission/radio receiving device enters, in the event of receiving the protocol message, the corresponding element and initiates a registration procedure for the corresponding mobile radio transmission/radio receiving device.

7. Method according to claim 1, wherein the protocol messages are generated in such a manner that they follow a protocol that provides for a separation of objects and actions.

8. Method according to claim 1, wherein the protocol messages are generated in a manner that they follow a protocol that is structured such that the stationary radio transmission/radio receiving device of the mobile radio transmission/radio receiving device transmits a menu structure, which is supported by the stationary radio transmission/radio receiving device, that is to be rendered on the mobile radio transmission/radio receiving device.

9. Method according to claim 1, wherein the protocol is generically structured.

10. Method according to claim 1, wherein the protocol is generically structured in such a way that the menu structure is stored as a list and/or processed as such.

11. Method according to claim 1, wherein the list is designed in such a way that entries are stored as configuration parameters in such an organized manner that they are provided with, at least as a first element, a particularly permanent parameter identification and, as a second element, a value of the parameter that can be manipulated.

12. Method according to claim 1, wherein the list is generated in such a manner that it is utilized as a caller list, a list for redialing, a telephone book list and/or a list of available lists.

13. Stationary radio transmission/radio receiving device, comprising means for executing the method according to claim 1.

14. Mobile radio transmission/radio recelvmg device, compromising means for executing the method according to claim 1.

* * * * *

UNITED STATES PATENT AND TRADEMARK OFFICE
CERTIFICATE OF CORRECTION

PATENT NO.         : 8,326,297 B2
APPLICATION NO.    : 12/744674
DATED              : December 4, 2012
INVENTOR(S)        : Dieter Kehren It is certified that error appears in the above-identified patent and that said Letters Patent is hereby corrected as shown below:

In claim 14, line 56, delete "rece1vmg" and add --receiving--.

Signed and Sealed this
Second Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,326,297 B2  
APPLICATION NO. : 12/744674  
DATED : December 4, 2012  
INVENTOR(S) : Dieter Kehren Page 1 of 1

It is certified that error appears in the above-identified patent and that said Letters Patent is hereby corrected as shown below:

In the Claims:

Column 16, line 56 (Claim 14, line 1) delete "rece1vmg" and add --receiving--.

This certificate supersedes the Certificate of Correction issued April 2, 2013.

Signed and Sealed this
Twenty-third Day of April, 2013

Teresa Stanek Rea
*Acting Director of the United States Patent and Trademark Office*